United States Patent [19]

Obra

[11] 4,020,708
[45] May 3, 1977

[54] EPICYCLOIDAL CRANK DRIVE MECHANISM

[75] Inventor: Bart R. Obra, St. Clair Shores, Mich.

[73] Assignee: Easom Engineering & Manufacturing Corporation, St. Clair Shores, Mich.

[22] Filed: Aug. 18, 1975

[21] Appl. No.: 605,716

[52] U.S. Cl. .................................................. 74/52
[51] Int. Cl.² .................................... F16H 37/12
[58] Field of Search .................................... 74/52

[56] References Cited

UNITED STATES PATENTS

| | | | |
|---|---|---|---|
| 2,250,584 | 7/1941 | Krueger et al. | 74/52 |
| 2,515,616 | 7/1950 | Thomas | 74/52 |
| 2,695,522 | 11/1954 | Papworth | 74/52 |
| 3,529,485 | 9/1970 | Köfferlein | 74/52 |

*Primary Examiner*—Samuel Scott
*Assistant Examiner*—Wesley S. Ratliff, Jr.
*Attorney, Agent, or Firm*—Andrew R. Basile

[57] ABSTRACT

An epicycloidal crank drive mechanism is disclosed as comprising a support frame mounting a prime mover coupled through a gear reducer to drive a primary rotary member about a first fixed axis on which a sun gear is concentrically disposed. The primary rotary member carries at least one roller gear that is engaged by the sun gear such that the roller gear rotates about a second axis which is parallel to the fixed first axis and movable with respect to said first axis as the primary rotary gear is driven by the prime mover. The roller gear has an upper portion on which is mounted a roller adapted to movably engage a slotted section formed in a plate member. The plate member is driven by the roller for rotation about the first fixed axis. The plate member carries a crank arm which moves through a motion that varies relative to the velocity of the primary rotary member. The mechanism is disclosed as an integral part of two types of crank mechanisms. In the first embodiment the crank mechanism functions to actuate a rack for the purpose of positioning locating pins in a transfer mechanism, while in the second embodiment the crank mechanism functions to actuate a transfer bar elevating mechanism.

9 Claims, 10 Drawing Figures

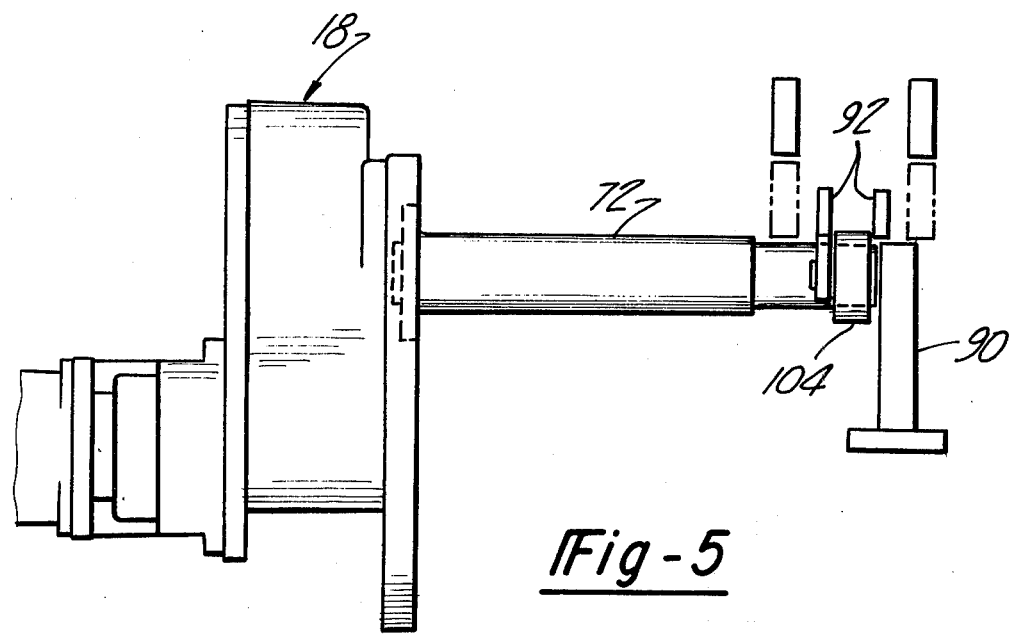
Fig-5
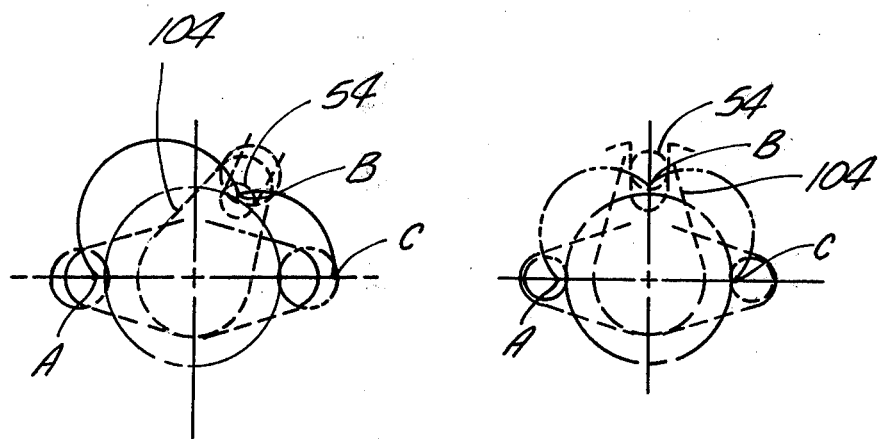
Fig-9
Fig-10

EPICYCLOIDAL CRANK DRIVE MECHANISM

CROSS-REFERENCE TO RELATED APPLICATIONS

The present invention is related in substance to co-pending U.S. patent application Ser. No. 584,791, filed June 9, 1975, for "MOTION GENERATING MECHANISM" in the name of Bart R. Obra and the same is incorporated herein by reference.

BACKGROUND OF THE INVENTION

I. Field of the Invention

The present invention relates to cyclicly repetitive motion generating mechanisms and, in particular, the present invention relates to a mechanism which will generate an output that has a selected output motion particularly adapted for use in transfer systems.

II. Description of the Prior Art

Heretofore, numerous devices and mechanisms have been utilized to provide a desired output motion of a member along a prescribed path such as the indexing bar of a transfer machine or the mechanisms employed in elevating the transfer bar of such mechanisms or, in specific applications, the positioning of a locating pin of the type employed in such transfer mechanisms. An example of an indexing machine disclosed in the prior art is illustrated in U.S. Pat. No. 3,857,292. This mechanism was designed to achieve a cycloidal motion of an output member along a linear path. Other mechanisms disclosed in the prior art generally achieve cyclicly repetitive motion by utilizing complicated cam grooves and followers to accomplish predetermined acceleration, deceleration, dwell, and reversing characteristics for the output member. To the knowledge of the inventor, such machines and, in particular, the type disclosed in the aforementioned patent have very little flexibility in varying from the cycloidal acceleration curve to either increase or decrease the dwells and peak speeds of the output member. Because of the various types of applications, such as the aforementioned transfer bar elevating mechanism and locating pin mechanisms, it is desirable to have a mechanism which will generate an output wherein any number of dwells may be easily obtained without a major modification and design of the mechanism.

To the knowledge of the inventor, no such prior art apparatus or mechanism is known.

SUMMARY OF THE INVENTION

The present invention, which will be described subsequently in greater detail, comprises a mechanism having an output member that is movable along a prescribed path with a predetermined selected motion. The mechanism comprises a support frame upon which a primary gear is mounted for rotation about a first fixed axis, with the primary gear supporting a second gear for rotation about a second axis that is both parallel and movable with respect to the first fixed axis. Motion imparting means are provided for engaging the secondary gear to rotate the same about the second axis as the primary gear is rotated by a prime mover. The rotary member, carried by the support frame, is coupled to the secondary gear by means of a coupling member which rotates the rotary member in such a manner that an output member attached thereto will move along a prescribed path and have a selected output motion.

It is therefore an object of the present invention to provide a mechanism which, with a simple constant velocity input, will provide a rotating crank arm movable through a predetermined motion.

It is a further object of the present invention to provide a mechanism having an output motion in which the number of dwell periods may be easily varied, as well as the length of the dwell period.

It is a further object of the present invention to provide a mechanism of the type described which is relatively simple in construction, compact in size, and which operates in an enclosed environment to protect it against foreign particles as well as to provide a simple and efficient means for lubricating the same.

It is still a further object of the present invention to provide a mechanism of the type described herein which may be used as the motive force in actuating a transfer bar elevating mechanism.

It is still an object of the present invention to provide a mechanism of the type described herein which may be used as the motive force for actuating a locating pin mechanism of a transfer system.

Other objects, advantages, and applications of the present invention will become apparent to those skilled in the art of epicycloidal crank mechanisms when the accompanying description of two examples of the best modes contemplated for practicing the invention are read in conjunction with the accompanying drawings.

BRIEF DESCRIPTION OF THE DRAWINGS

The description herein makes reference to the accompanying drawings wherein like reference numerals refer to like and similar parts throughout the several views, and in which:

FIG. 5 is a fragmentary side elevational view of a second embodiment of the present invention in the form of an epicycloidal crank mechanism for actuating the transfer bar elevating mechanism of a transfer machine;

FIG. 9 is a schematic view illustrating an alternate planetary gear set for producing two dwell points for the crank mechanism illustrated in FIGS. 5–8 of the drawings; and FIG. 10 is a schematic illustration of a second alternate planetary gear ring for producing three dwell points for the crank mechanism in FIGS. 5–8 of the drawings.

DESCRIPTION OF THE PREFERRED EMBODIMENTS

Figure 1:
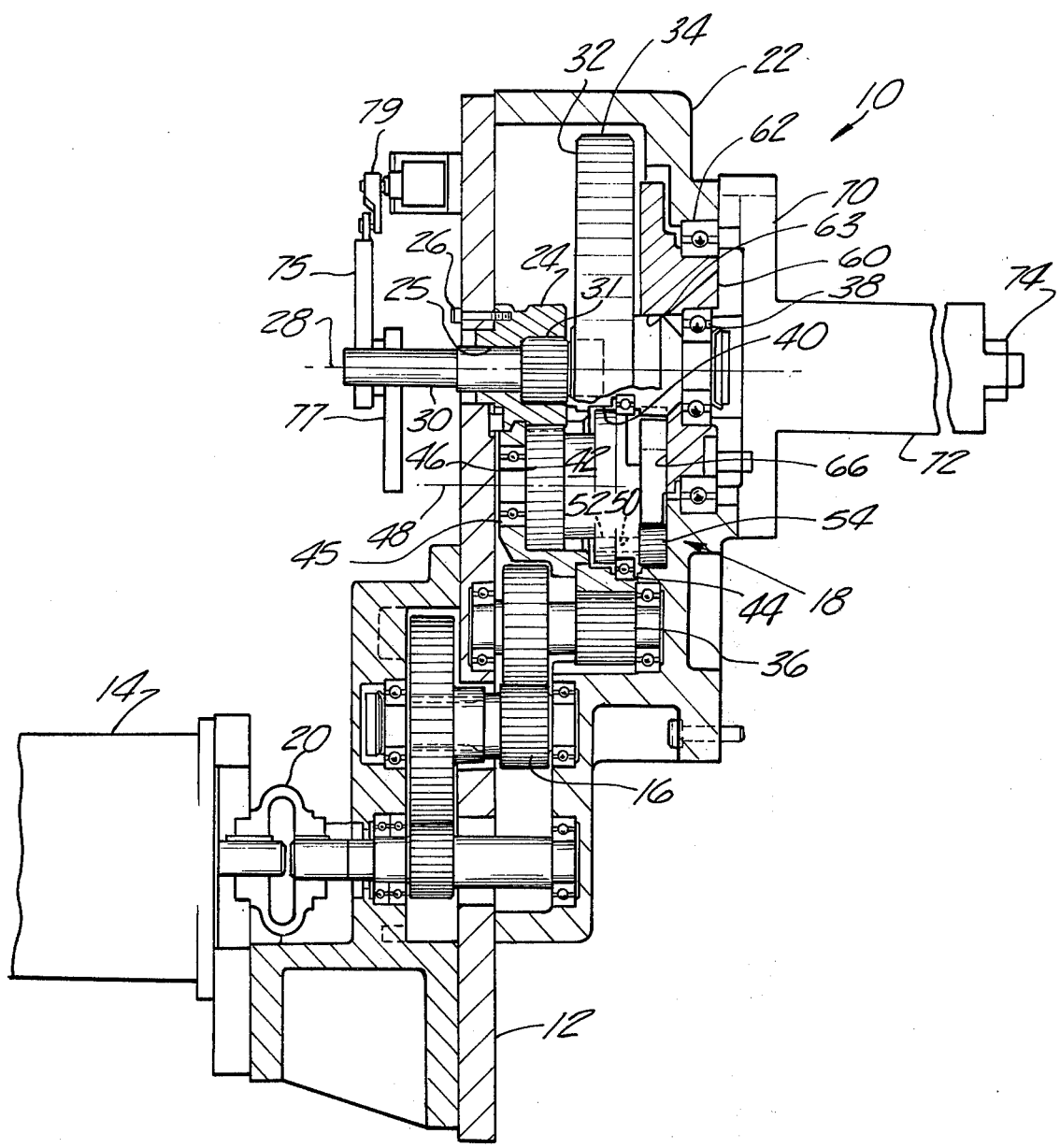
FIG. 1 is a fragmentary cross-sectional view of a crank mechanism constructed in accordance with the principles of the present invention.

Referring now to the drawings and, in particular, to FIG. 1 wherein there is illustrated one example of the present invention in the form of an epicycloidal crank mechanism 10 comprising a base 12 that supports a prime mover such as an electric motor 14, a gear reducer 16, and an epicycloidal motion generating mechanism 18. The prime mover, or electric motor, 14 is connected to the gear reducer through a suitable coupling device 20.

The motion generating mechanism 18 comprises a housing 22 which mounts a fixed sun gear 24 by any suitable means such as bolts 26 extending through the housing 22 and into threaded engagement with the sun gear 24. The non-rotating sun gear 24 is concentric about a first fixed axis 28. The sun gear 24 has an internal bore 25 that supports a support shaft 30 for concentric rotation about the fixed axis 28. Suitable bearings 31 disposed within the sun gear bore 25 provide the necessary support for the rotating support shaft 30. The mechanism 18 further comprises a primary rotary member 32 having an outer gear 34 formed on the outer surface thereof and which is drivingly engaged by a drive gear 36 of the gear reducer 16. The primary rotary member 32 is supported by the support shaft 30 for concentric rotation about the fixed axis 28 by means of the aforementioned bearing 31 and a bearing 38, which will be described in greated detail hereinafter. It can thus be seen that, when the gear reducer 16 is driven by the prime mover 14, the gear reducer drive gear 36 will function to drive the outer gear 34, and the primary rotary member 32 will be rotated about the fixed axis 28 concentrically with the sun gear 24.

The primary rotating member 32 is provided with an aperture 40 which rotatably supports a secondary rotary member 42 by means of right-hand bearing member 44 and left-hand bearing member 45, both of which are carried by the primary rotary member 32. While only one secondary rotary member 42 is described herein, it should be understood that in the event additional loads must be carried by the crank mechanism, the same may be accomplished by providing additional secondary rotary members 42 as needed. For purposes of simplicity only one such secondary member will be described herein in detail; however, it should be remembered that a plurality of arcuately-spaced apertures 40 may be provided with each aperture rotatably supporting a secondary rotary member 42, with the number of such rotary members 42 depending upon the size of the load to be carried by the mechanism. Still referring to FIG. 1, it can be seen that the secondary rotary member 42 has a lower portion on which a roller or planetary gear 46 is provided. The planetary gear 46 is adapted to mesh with the non-rotating sun gear 24; and, thus, it can be seen that, as the drive gear 36 rotates the primary rotating member 32 about the fixed axis 28, the engagement of the roller gear 46 with the sun gear 24 will result in the rotation of the secondary member 42 about an axis 48. The planetary gear 46 is concentric about the axis 48 which, in turn, is parallel to the first axis 28 but angularly movable with respect to the first axis 28 as the primary member 32 rotates. It should be noted that the ratio between the non-rotating sun gear 24 and the planetary or roller gear 46 is of prime importance. As will be explained hereinafter with respect to the dwell points of the mechanism, when a 1:1 ratio between the sun gear 24 and the planetary or roller gear 46 is maintained, one dwell point per revolution of the mechanism will be obtained. If the ratio between the non-rotating sun gear 24 and the planetary gear 46 is increased to a 2:1 ratio, then the resulting system will have two dwell points during each revolution of the mechanism. Similarly, if the ratio between the non-rotating sun gear 24 and the planetary or roller gear 46 is changed to a 4:1 ratio, then four dwell points will be obtained for each revolution of the mechanism. This relationship, as well as the manner in which the length of the dwell period may be varied, will be described in greater detail hereinafter.

Still referring to FIG. 1, the right-hand portion of the secondary rotary member 42 is provided with a horizontal aperture 50 within which is disposed a support pin 52, the outer or exposed end of which rotatably supports a drive roller 54. The drive roller 54 is disposed on the pitch line of the roller gear 46. During the initial operation of the mechanism 18, when the drive roller 54 is in line with the pitch line of the roller gear 46 on the side thereof closest to the axis 28 as shown in FIG. 3 of the drawings, the mechanism 18 will be at a dwell position. As the primary rotating member 32 rotates and thereby rotates the secondary member 42 to move the roller along the path illustrated in phantom lines in FIGS. 2–4, the roller 54 will move to a position farthest away from the axis 28 at which time a maximum angular velocity will have been reached. While the motion and operation of the mechanism will be described in greater detail hereinafter, it should be noted that by changing the relationship of the drive roller 54 with respect to the roller gear 46, that is, by repositioning the drive roller 54 at locations toward the center 48 of the roller gear 46 (at positions away from the pitch line of the roller gear 46), the maximum velocity and dwell period will decrease. If the roller drive 54 is moved radially outward from the axis 48, that is, beyond the pitch line of the roller gear 46, the maximum velocity and dwell period would increase.

The mechanism 18 further comprises a drive plate 60 which is rotatably supported by means of a bearing 62 carried in the side walls of the housing 22. The bearing 38 which supports the right end of the shaft 30 which, in turn, supports the primary rotary member 32 is carried in a central aperture 63 of the drive plate 60. The inner surface of the drive plate 60 has a radial slot 66 which is movably and slideably engaged by the drive roller 54 to rotate the drive plate 60 about the axis 28 with acceleration and velocity characteristics similar to that described in the aforementioned copending U.S. patent application Ser. No. 584,761, filed June 9, 1975.

A crank plate 70 is attached to the outer surface of the drive plate 60 by any suitable means such as bolts (not shown) that extend through the crank plate 70 and into threaded engagement with the drive plate 60. The crank plate 70 carries an output shaft 72 that is adapted to rotate about the fixed axis 28. The extended end of the output shaft 72 has a suitable coupling mechanism for attaching a crank arm 74, which will be described in greater detail with respect to the embodiment illustrated in FIGS. 2, 3, and 4 of the drawings. It should be noted in FIG. 1 that the support shaft 30 carries a pair of dogs 75 and 77 which engage suitable electrical switches 79 carried by the housing 22 to indicate when the output shaft 72 has rotated a predetermined amount, depending upon the particular type of application, wherein the electrical switches 79 will function to control the electrical motor 14 so as to reverse the rotation as desired, again depending upon the particular application of the present inventive mechanism 18.

Prior to a further detailed description of the various embodiments of the present invention, it should be noted that, since the mechanism 18 may be completely enclosed, there is no difficulty with falling chips or cooling problems which may be associated with such systems. Additionally, since the mechanism 18 may be totally enclosed, the various gears may be grease packed and, thus, eliminate special lubricating problems. It can also be seen that, because of the simple construction of the mechanism 18, it can be easily manufactured; and the mechanism may be easily adjusted for dwells and the length of dwells as will be described hereinafter. Additionally, because of the large diameter of the primary rotary member 32, the required reduction is more readily obtained through spur gears rather than the more expensive and less efficient worm reduction. It should also be noted that, because of the compact size of the mechanism 18, it may be located at most any convenient position between stations of a transfer system.

Figure 2:
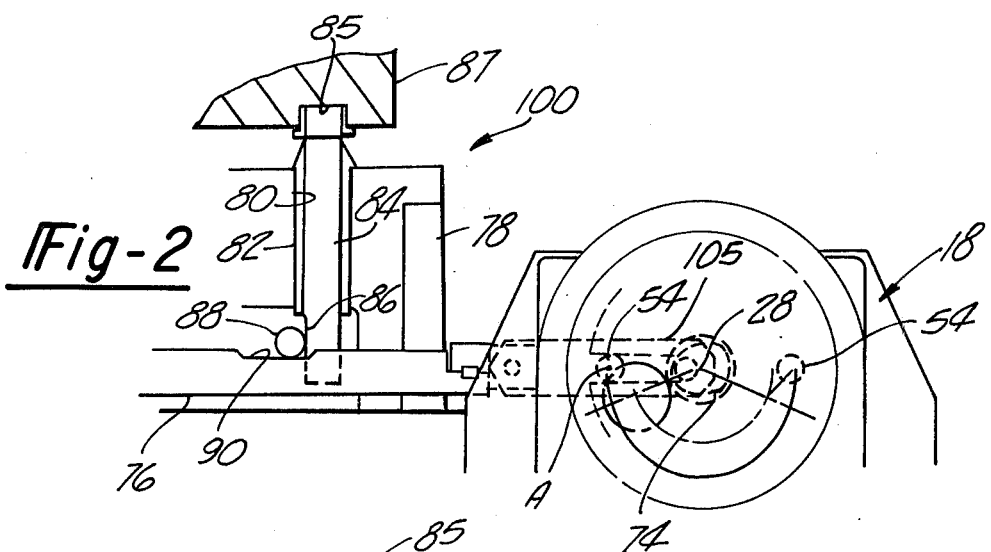
FIG. 2 is a fragmentary, partially sectioned side elevational view of an epicycloidal crank mechanism used to actuate the locating pins of a transfer system with the locating pin illustrated in a lowered position.
Figure 3:
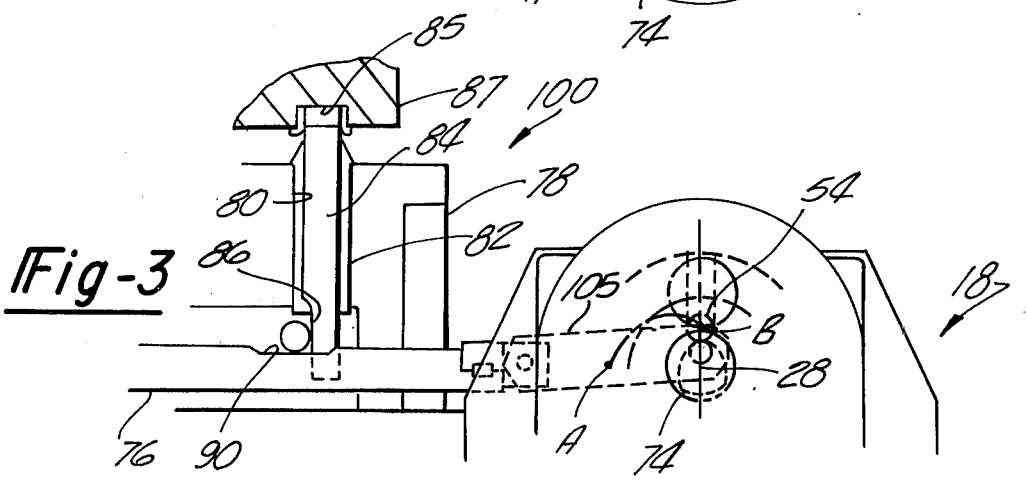
FIG. 3 is a fragmentary, partially-sectioned view, similar to FIG. 2, illustrating the locating pin in a dwell position.
Figure 4:
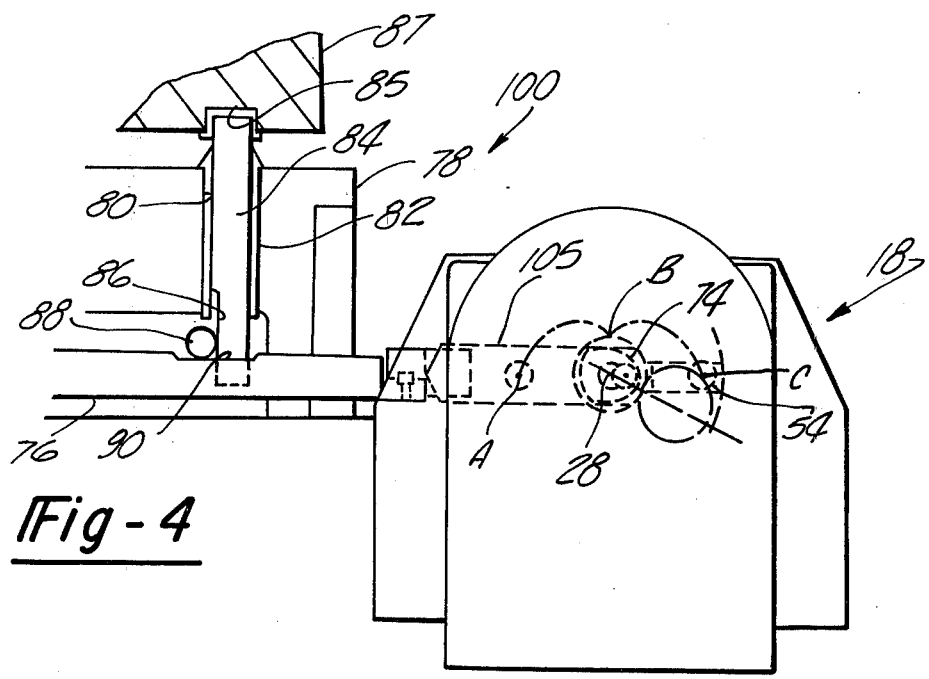
FIG. 4 is a fragmentary, partially-sectioned side elevational view of the crank mechanism illustrated in FIGS. 2 and 3 with the locating pin illustrated in a maximum raised position.

Referring now to FIGS. 2–4 for a description of the epicycloidal crank mechanism 18 used to actuate a locating pin mechanism 100. The crank arm 74, as can best be seen in FIG. 2, is mounted to the output shaft 72 at a point which is offset from the axis 28 by a predetermined amount in order to provide for the cranking motion. The crank arm 74 has its extended end pivotably coupled to the crank line 105 which is attached to a common rack 76 that extends through the transfer machine on which the locating pin mechanism 100 is disposed. The mechanism 100 further comprises a support frame 78 which has a plurality of longitudinal apertures 80 supporting pin bushings 82 which, in turn, reciprocally mount locating pins 84. The lower end of each locating pin 84 is machined to form teeth 86 that cooperate with a pinion gear 88 which, when rotated in the counterclockwise direction as viewed in FIGS. 2–4, results in the raising of the locating pin; and when rotated in a clockwise direction as viewed in FIGS. 2–4, it moves the pin 84 to its lowered position. Rotation of the pinion gear 88 is accomplished by means of its engagement with the teeth 90 formed on the common rack 76. It should be understood that a plurality of such gears teeth 86 and locating pins 84 are provided along the length of the transfer machine in the conventional manner; however, only one such locating pin 84 is disclosed herein for purposes of describing the inventive mechanism. It can be seen that, when the common rack 76 is in the position illustrated in FIG. 2 and the pin 84 is in its lowered position as shown, rotation of primary rotary member 32 will raise the pin 84. Thus, when the roller 54 which is initially located at the point "A," is rotated 90° to the position "B," that is, as the crank arm 74 is rotated in a clockwise direction as viewed in FIG. 3, the pin 84 will be raised to a contact position and will dwell prior to its entry into a contact recess 85 within the piece 87 in which the locating pins 84 are desired to engage for the purpose of properly locating the piece 87.

As can be seen in FIG. 4 of the drawings, as the roller 54 is rotated along its path as indicated by the phantom lines to the position "C," the locating pin 84 will be at the position illustrated in FIG. 4; that is, it will be at a maximum raised position and in an engagement with the recess 85 of the piece 87 desired to be positioned. As can be seen in FIG. 2, the continued clockwise rotation of the roller 54 will cause the crank shaft to return toward the mechanism 100 thereby shifting the rack 76 to the left and causing an opposite rotation of the gear 88 to lower the locating pin 84 from its maximum raised position to its lowered position. It should be noted that the electric motor 14 may be rotated in the same direction to advance and retract the pin 84. The pin is raised to its maximum raised position during the first 180° of rotation of the mechanism with one dwell point occurring at the midpoint of rotation, while the pin 84 is retracted to its lowered position during the return 180° of rotation of the crank arm 74 with the same being accomplished in a single motion no-dwell action, as a dwell period is not required during the return of the locating pin 84 to its lowered position as illustrated in FIG. 2 of the drawings.

Referring now to FIG. 5 of the drawings, wherein there is illustrated a second embodiment of the present invention in the form of the crank mechanism 18 wherein the output shaft 72 has its extended ends supported by a suitable support mechanism 90, while its intermediate section carries a crank arm assembly 92 which forms a means for actuating a transfer bar elevating mechanism to elevate a transfer bar 94.

Figure 6:
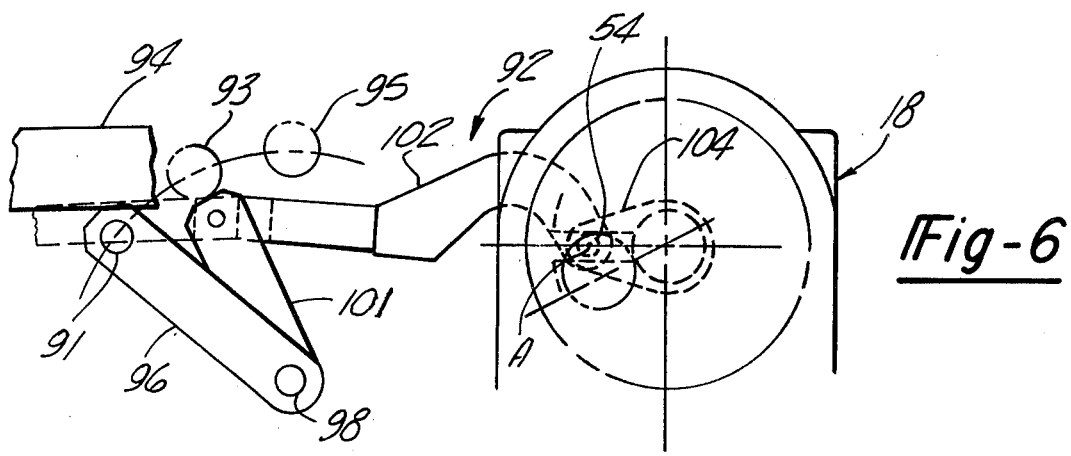
FIG. 6 is a fragmentary side elevational view of the crank mechanism illustrated in FIG. 5 with the transfer bar in a lowered position.
Figure 7:
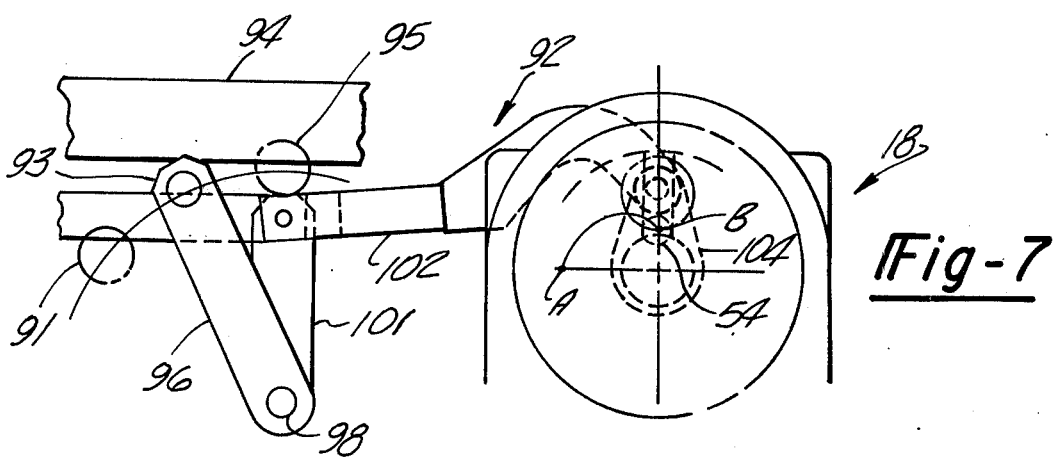
FIG. 7 is a fragmentary side elevational view of the crank mechanism illustrated in FIG. 6 with the transfer bar in a part-contact, dwell position.
Figure 8:
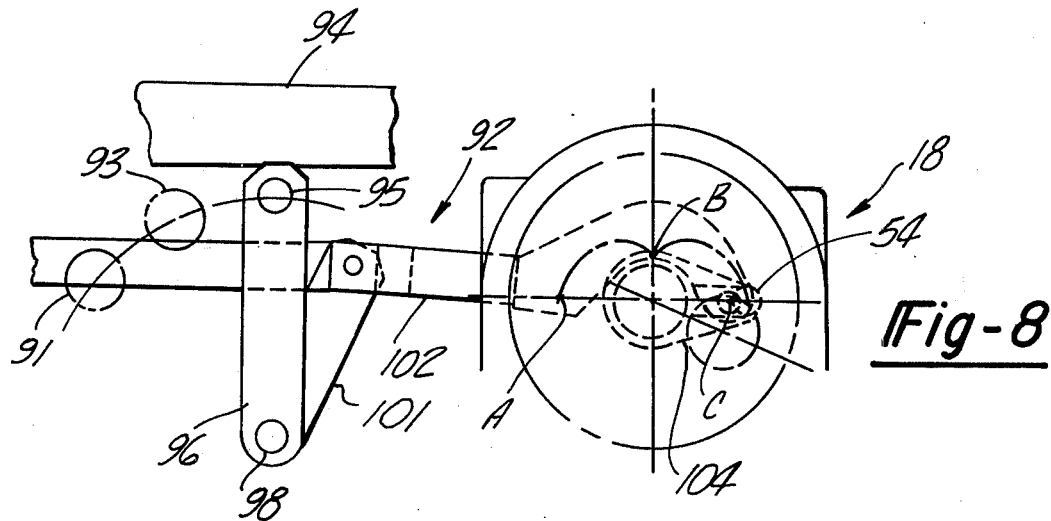
FIG. 8 is a fragmentary side elevational view of the crank mechanism illustrated in FIGS. 6 and 7 with the transfer bar in a maximum raised position.

FIG. 6 of the drawings illustrates the transfer bar 94 in its lowered position which is raised by means of engagement by a lever 96 which is pivoted about a fixed point 98 by means of an arm member 101 and which, in turn, is pivotably coupled to the crank link 102 which forms a part of the crank arm assembly 92. The crank arm assembly 92 further comprises a crank arm 104 which is attached to the output shaft 72 and which rotates about the fixed axis 28. The crank arm 104 is pivotably attached to the extended end of the link 102 at a point radially displaced from the axis 28 such as to provide the desired cranking motion as the output shaft 72 is rotated. It can be seen that, as the shaft 72 is rotated in a clockwise direction as viewed in FIGS. 6, 7, and 8, the crank arm 104 will rotate the assembly such as to rotate the lever 96 from its lowered position 91 as shown in FIG. 6 to an intermediate position 93 as shown in FIG. 7 to the fully raised or extended position 95 as shown in FIG. 8. Reversal of the electric motor 14 will cause the reversal of the rotation of the output shaft 72, and the roller 54 will follow the reversed path. It can be seen upon examination in FIGS. 6, 7, and 8 that, when the rotation of the shaft 72 is rotated 90°, the roller 54 will move from the position "A" shown in FIG. 6 to the position "B" shown in FIG. 7 wherein a dwell point wil be obtained. Continued rotation of another 90° will move the roller 54 to its farthermost position at "C" wherein the transfer bar 94 will have been raised to its maximum position. Reversal of the motor at this point will cause the roller 54 to follow the reverse of the path just described to return the transfer bar 94 to its lowered position with the dwell being obtained again at the point "B" during the return. The one dwell is obtained by having equal diametered gears for both the stationary gear 24 and the rotating or roller gear 46, as aforementioned.

As can be seen in FIG. 9 of the drawings, the ratio between the roller gear 46 and the fixed sun gear 24 may be changed to provide for two dwell periods; that is, as the transfer bar is lowered, there is a dwell position at "A," and a dwell position is obtained at "B"

when the transfer bar 94 is in an intermediate position as shown in FIG. 7 of the drawings. In the third position wherein the transfer bar is in its fully raised position, as shown in FIG. 8 of the drawings, there is no dwell at "C" as the same is not required.

In FIG. 10 the planetary gear set arrangement produces three dwell periods; that is, at points "A," "B," and "C" when a dwell is obtained respectively at the initial contact position "A," at an intermediate crank position "B," and at the last position wherein the crank position is such that the transfer bar is in its maximum raised position "C." In each of the two aforementioned situations the bar is lowered by reversing the motor 14 so as to reverse the rotation of the output shaft 72. It can thus be seen that in the present inventive applications of the crank mechanism 18, the same is very versatile and that the number of dwells may be easily obtained by changing the relationship between the roller gear 46 and the fixed sun gear 24 in the aforementioned manner. Additionally, it can be seen that the length of the dwell period may easily be changed by positioning the roller 54 in relation to the center of the roller gear 46, as also aforementioned.

It should also be noted that the use of the output crank provides a deceleration at the end of each movement and provides a mechanical limit on the amount of travel. This is a marked advantage over the prior art and particularly the type disclosed in the aforementioned patent wherein the cycloidal lifting mechanism employed thereon will continue to operate if a brake is not applied to stop the same; thus, the limit of travel in the prior art apparatus is determined by the braking of the cycloidal mechanism, and this difficulty is completely eliminated by the use of a crank which has defined mechanical limits of movement.

It can thus be seen that the present invention has provided a new and improved mechanism which, with a simple constant velocity input, will produce a desired output along a prescribed path, all of which is accomplished in a manner which offers the user a great variety of acceleration characteristics, dwell points, and lengths of dwell points not heretofore obtainable with a single design.

It should also be understood that the present invention has provided a new mechanism of the type described herein which is relatively simple in construction, compact in size, and will operate in an enclosed and, thus, safe environment.

It should also be understood by those skilled in the art of motion generating machines that other forms of the present invention may be had, all coming within the spirit of the present invention and the scope of the appended claims.

What is claimed is as follows:
1. A motion generating mechanism comprising:
   a support frame;
   a first rotary member carried by said support frame for rotation about a fixed first axis;
   first driving means for driving said first rotary member;
   a second rotary member carried by said first rotary member and rotatable therewith about said first axis as said second rotating member rotates about a second movable axis that is parallel to said first axis;
   rotation inducing means carried by said support frame and engaging said second rotary member for rotating said second rotary member about said second axis;
   a third rotary member carried by said support frame for rotation about said first axis;
   a crank arm extending from said third rotary member for motion through a non-linear path; and
   a coupling member carried by said second rotary member and spaced from said second axis, said coupling member movably engaging said third rotary member to rotate said third rotary member about said first axis as said second rotary member rotates, said third rotary member having a radial slot disposed on the side thereof adjacent to said coupling member, said coupling member engaging said third rotary member by means of said slot for imparting motion thereto, said coupling member being disposed along an axis which is spaced from said second axis whereby the motion of said crank arm varies in a prescribed manner relative to the acceleration and velocity of said first driving means.

2. The motion generating mechanism defined in claim 1 wherein said rotation inducing means is a stationary gear carried by said support frame, said second rotary member having a gear formed thereon and engaging said stationary gear such that said second rotary member rotates about said second movable axis as said first rotary member moves said second rotary member relative to said stationary gear.

3. The motion generating mechanism defined in claim 2 wherein the ratio of the pitch diameter of said stationary gear to the pitch diameter of said second rotary member gear determines the number of dwell periods per revolution of said first rotary member.

4. The motion generating mechanism defined in claim 1 wherein said coupling member axis is in line with the pitch line of said second rotary member gear.

5. The motion generating mechanism defined in claim 2 wherein said first rotary member has an aperture within which said second rotary member is rotatably mounted with the gear of said second rotary member engaging said stationary gear, the outer surface of said first rotary member being provided with a ring gear engagable by said first driving means for rotating said first rotary member about said first fixed axis, said stationary gear being concentric with said first fixed axis.

6. The motion generating mechanism defined in claim 3 further comprising:
   a transfer machine having a plurality of locating pins adapted to be moved from a lowered position to a raised position wherein the upper ends of the pins engage the work piece to be positioned;
   rack and pinion means engaging said lower end of said locating pins to raise and lower said pins as said rack is reciprocated; and
   means coupling said crank arm to said rack to reciprocate the same.

7. The motion generating mechanism defined in claim 3 further comprising:
   a transfer machine having a transfer bar adapted to be raised and lowered in a predetermined manner;
   first lever means movable from a lowered position to a raised position, said lever means engaging said transfer bar at an intermediate position for raising said transfer bar to said raised position, said lever means being movable in an opposite direction for moving said transfer bar from said raised position back to said lowered position; and;

link means connecting said crank arm to said lever arm for moving said crank arm in a predetermined manner.

8. The motion generating mechanism defined in claim 1 wherein the rate of acceleration of said crank arm may be decreased by positioning said coupling member along an axis which is between the pitch line of said second rotary member gear and said second axis.

9. The motion generating mechanism defined in claim 8 wherein the ratio of the pitch diameter of said secondary gear to the pitch diameter of said second rotary member gear determines the number of dwell periods per revolution of said first rotary member, and the length of said dwell periods is determined by the positioning of said coupling member axis with respect to said second axis, the length being decreased as said coupling member is positioned closer to said second axis.

* * * * *